Figure 1:
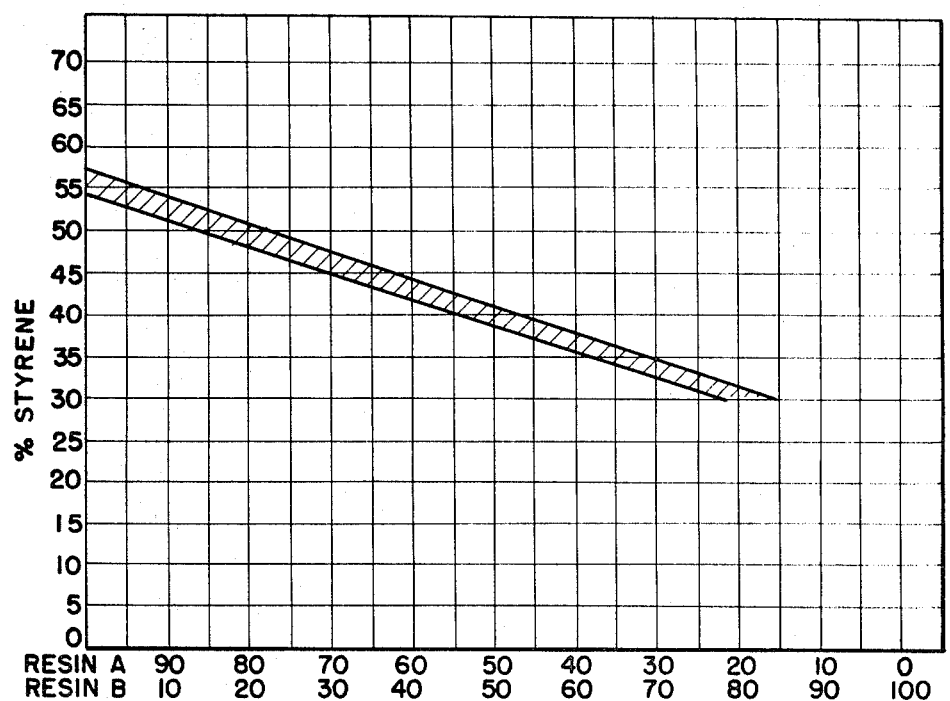

United States Patent

[11] 3,607,530

[72] Inventor Robert E. Carpenter
    Minnetonka, Minn.
[21] Appl. No. 690,143
[22] Filed Dec. 13, 1967
[45] Patented Sept. 21, 1971
[73] Assignee Ashland Oil, Inc.
    Ashland, Ky.

[54] PREPARATION OF GLASS-REINFORCED POLYESTER SHEETS
2 Claims, 2 Drawing Figs.

[52] U.S. Cl. .................................................. 156/245, 156/64
[51] Int. Cl. .................................................. B29c 19/00
[50] Field of Search .......................................... 156/62.2, 64, 99, 180, 181, 245, 296, 332

[56] References Cited
UNITED STATES PATENTS

| | | | |
|---|---|---|---|
| 2,794,759 | 6/1957 | Dildilan | 156/62.2 X |
| 2,830,648 | 4/1958 | Haddox | 156/62.2 |
| 3,155,567 | 11/1964 | Harr | 156/62.2 X |
| 3,244,580 | 4/1966 | Stalego | 156/62.2 X |
| 3,344,014 | 9/1967 | Rees | 156/332 X |
| 3,413,188 | 11/1968 | Allen | 156/332 X |
| 3,447,999 | 6/1969 | Rogier et al. | 156/332 X |

*Primary Examiner*—Benjamin R. Padgett
*Assistant Examiner*—Stephen J. Lechert, Jr.
*Attorneys*—Walter H. Schneider, William Kammerer and T. Gene Dillahunty

ABSTRACT: A method for the preparation of clear or transparent glass-reinforced plastic sheets or panels using a mixture of two different resins in controlled proportions. Rigid fiberglass-reinforced polyester panels (e.g., corrugated or decorative), having a negligible glass pattern when observed with the unaided eye, can be prepared in this manner. Such glass panels have a uniform appearance and can be made substantially clear or transparent.

INVENTOR.
ROBERT E. CARPENTER
BY
CECIL C. SCHMIDT
HIS ATTORNEY

PREPARATION OF GLASS-REINFORCED POLYESTER SHEETS

BACKGROUND OF THE INVENTION

The preparation of decorative and functional panels, sheets, or other molded plastic products from plastic-forming materials (e.g., unsaturated polyester resins) is well known. It is also known that the strength of such panels can be increased by embedding glass fibers or filaments in the panels during manufacture. This can be done by mixing a hardenable resin or plastic precursor (e.g.,) a mixture of an unsaturated polyester and styrene) with glass fibers prior to the forming and curing operation.

Many glass-reinforced panels are objectionable for certain uses because light rays passing through the reinforced panels are reflected and/or refracted in such a way as to make the glass fibers visible.

To overcome these deficiencies, attempts have been made to match the refractive indices of the plastic matrix and the reinforcing glass to thereby obtain clear or transparent panels. However, repeatedly adjusting the composition of the glass to match the various refractive indices of different resins is not practical. As a consequence, the glass used to reinforce plastic bodies or sheets is typically supplied without offering a choice to the customer of refractive index. Similarly, adjusting the formulation of the plastic (i.e. by modifying the composition of the precursors for the plastic) to match the refractive index of the glass is difficult and frequently impractical. A further complicating factor is that manufacturers of reinforced glass laminates or panels often have different requirements for the plastic-forming materials (often, polymerizable syrups) in terms of viscosity, gel time, cure time, rigidity, reactivity, etc. As a result, considerable effort is often expended by resin manufacturers in meeting requirements (e.g. viscosity) for the polymerizable or hardenable plastic-forming material and, at the same time, maintaining a material capable of providing clear, glass reinforced laminates.

DESCRIPTION OF THE INVENTION

I have now discovered that it is possible to readily meet various requirements (e.g. viscosity), if any, for the hardenable or polymerizable plastic-forming materials and, at the same time, insure that the resulting glass-reinforced laminates or panels will be clear or transparent.

Briefly described, my invention comprises the use of a mixture of at least two different unsaturated polyester resins in conjunction with one or more copolymerizable monomers. The relative amounts of the two resins and the amount of copolymerizable monomer are determined on the basis of predetermined correlations of (1) resin composition with (2) the clarity of glass-reinforced plastic panels made from such resins.

My invention can be understood from the following observations. First, glass fibers often have a refractive index within the range of 1.51–1.69 (e.g. 1.55). Polymerizable or hardenable polyester syrups (i.e., mixtures of unsaturated polyester resins with 20–40 weight percent monomer such as styrene) will have a refractive index when cured or hardened of 1.50–1.57 (e.g. 1.53). Polymers of the typical copolymerizable monomers (e.g. styrene) have still different refractive indices (e.g. 1.60 for polystyrene and 1.49 for polymethyl methacrylate). Thus, it is possible to blend two or more polyester syrups with one or more copolymerizable monomers and, by properly balancing the composition, obtain glass-reinforced panels having no noticeable glass pattern. The one limitation is a requirement that one of the syrups or monomers have a refractive index (after curing or polymerizing) which is below that of the reinforcing glass fibers and that another syrup or monomer have a refractive index after curing or polymerizing which is above that of the reinforcing glass fibers.

The necessary correlations can be made as follows (for the purpose of illustration, only). Two conventional polyester resin syrups (resin plus copolymerizable monomer such as styrene) are selected. The two syrups are then mixed together (e.g., a 50—50 mixture by weight), the mixture of syrups is divided into portions, and each portion is diluted with a different amount of added styrene (or other copolymerizable monomer). The resulting mixed and diluted syrups, differing only in styrene content, are then used to form glass-reinforced panels which are inspected for clarity. The procedure is repeated at the same weight ratio of the original two syrups until it is known at what concentration or range of concentrations of styrene the resulting glass-reinforced polyester panels will be clear or have a negligible glass pattern. The composition of those blends producing clear plastic panels is recorded.

The entire procedure is then repeated several different times, using different weight ratios of the original two resin syrups. The accumulated data is then recorded in some retrievable form, e.g. plotted on graph paper (see FIG. 1). The line or band thus obtained indicates those compositions which will give clear or transparent laminates or panels when reinforced with common glass fibers or filaments.

Because of the use of automatic equipment and certain other considerations, panel forming or laminating operations are frequently designed around the use of plastic-forming materials (e.g. polyester resin syrups) having varying, but preselected specifications (e.g. having a predetermined viscosity). Consequently, it is useful if a separate correlation (e.g. the graph of FIG. 2) is prepared to show the viscosities of the mixed and diluted syrup compositions falling along the line or band shown in FIG. 1. In FIG. 2, viscosity has been correlated with styrene content.

Figure 2:
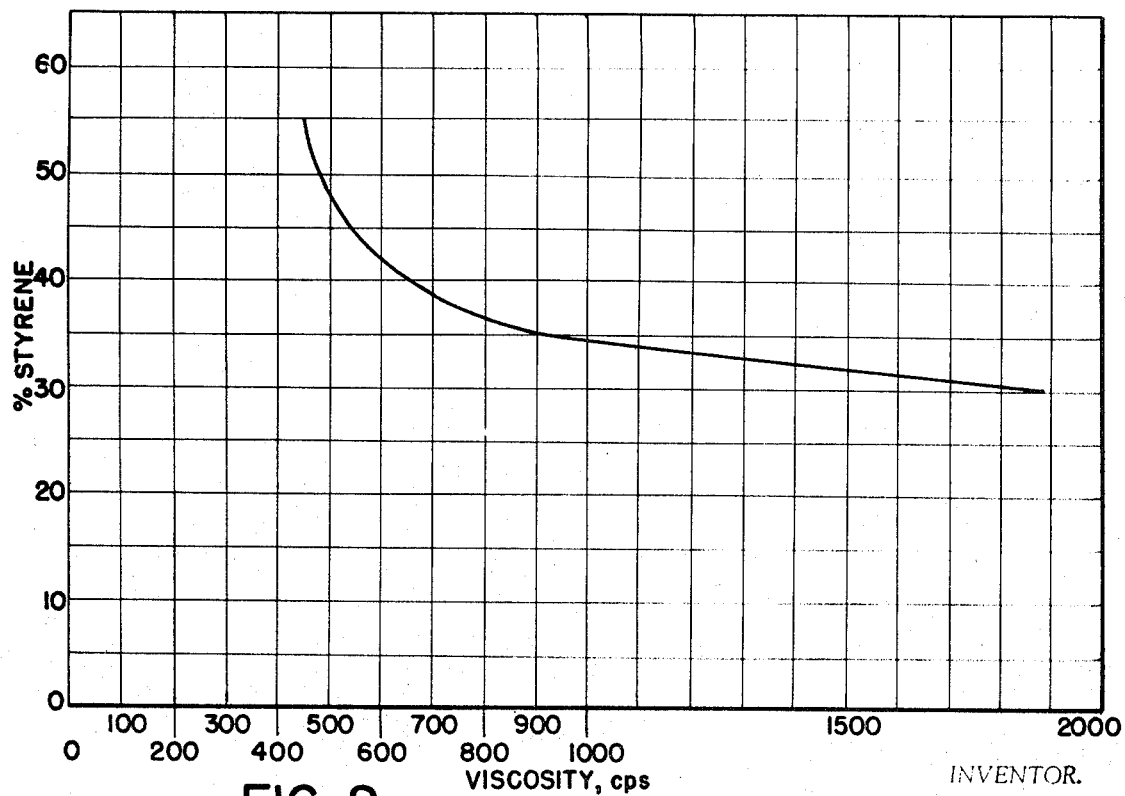

In actual use, any composition falling within the band shown in FIG. 1 can be used to prepare clear or transparent glass-reinforced laminates or panels. However, if a manufacturer specifies that the polymerizable or hardenable plastic-forming material used by it must meet certain viscosity requirements, a suitable resin composition can be selected by merely locating the desired viscosity on the viscosity curve (see FIG. 2), thereby identifying a suitable composition (by percent styrene) on FIG. 1 which will provide a clear or transparent panel.

The polyesters which can be used in this invention include the linear unsaturated polyesters. Such polyesters are prepared from copolymerizable dicarboxylic acids or anhydrides (e.g. maleic anhydride or fumaric acid) and glycols (i.e. dihydric alcohols) or their precursors (e.g. propylene oxide). The properties of such resins can be altered by the additional use of other carboxylic acids (e.g. adipic acid, phthalic anhydride, isophthalic acid, chlorendic acid, tetrachloro phthalic acid, etc.) and the use of minor amounts of polyhydric alcohols (e.g., glycerine, pentaerythritol, etc.).

The most common copolymerizable monomers are styrene and methyl methacrylate. Mixtures of monomers can be used (e.g. a mixture of styrene and methyl methacrylate). Styrene is the preferred copolymerizable monomer.

The selection of suitable unsaturated polyesters and copolymerizable monomers is not critical and is an act within the skill of the art when guided by this disclosure. See, for example, POLYMERS & RESINS, by Brage Golding, copyright 1959 by the D. Van Nostrand Company, Inc. However, it should be understood that the physical and chemical properties (e.g. impact strength) of glass-reinforced panels are dependent upon the selection and combination of polyester resins and monomers.

The present invention is further illustrated by the following specific example which is a preferred embodiment. Unless otherwise indicated, all parts and percentages are by weight.

EXAMPLE I

In this example, two commercially available unsaturated polyester resin syrups were employed. The first (hereinafter called "Resin A") was AROPOL 7010 (a product of Ashland Chemical Company) which contains 75 percent unsaturated polyester resin and 25 percent styrene (as a copolymerizable monomer). The second resin (hereinafter called "Resin B") was AROPOL 7420 (a product of the same company) which is a different unsaturated polyester resin diluted with 30 percent styrene. A number of blends of Resin A and B were prepared at different syrup weight ratios (i.e. the weight ratio of the two resin solutions, as is). EAch of these blends was then divided into portions. Each of the portions pertaining to a particular blend were then diluted with differing amounts of styrene. The resulting mixed and diluted syrups were then used to prepare a series of glass-reinforced panels in a conventional manner using commercially available glass fibers. The resulting panels were then inspected for clarity and transparency (i.e. minimal or negligible glass pattern).

For each given blend, the clearest panel of the series was identified. Then, additional panels were prepared using the same blend or ratio of Resins A and B, but at styrene contents slightly above and below the amount of styrene which gave the clearest panel in the first series of experiments. The procedure was repeated until optimum clarity was obtained.

The data obtained by these experiments were then plotted on graph paper with the results as shown in FIG. 1. In this case, a band of compositions is shown instead of a single line. Within this band, there did not appear to be any significant difference in the clarity or transparency of the glass-reinforced panels.

The viscosities of the syrups falling within the band shown in FIG. 1 were measured and plotted as shown in FIG. 2.

With the aid of FIGS. 1 and 2, the preparation of clear glass-reinforced polyester panels can be accomplished by selecting a syrup falling within the band shown in FIG. 1. Any syrup falling anywhere within this band (e.g., a 50—50 blend of Resin solutions A and B diluted to a 40 percent styrene content) will produce clear or substantially clear glass-reinforced polyester panels and have been demonstrated to do so. Thus, a 50—50 blend of resin solutions A and B diluted to a 40 percent styrene content and used to form a glass-reinforced polyester panel in a conventional manner produces a panel having no noticeable glass pattern when observed with the naked eye.

However, if a particular viscosity resin is needed in a manufacturing operation, the data in FIG. 2 will be used. In the case of FIG. 2, viscosity has been correlated with percent styrene. Having obtained the percent styrene from FIG. 2 corresponding to the desired viscosity (e.g., 35 percent styrene for 900 c.p.s.), one then locates that percent styrene (i.e. 35 percent styrene) on FIG. 1 and prepares a polyester syrup falling within the band at that styrene content. The composition so identified will have the desired viscosity and produce a clear glass-reinforced plastic panel.

Although the present invention has been described with a certain degree of particularity, it will be realized that numerous variations of this process can be made without departing from the spirit and scope of this invention.

What is claimed is:

1. A process for preparing laminates or panels which contain embedded glass-reinforcing fibers or filaments, which comprises:
    forming a mixture consisting essentially of two polyester resin syrups by mixing two such polyester resin syrups each of which polyester resin syrups contains a polymerizable unsaturated polyester and a copolymerizable monomer, wherein one of said polyester resin syrups when cured has a refractive index below the refractive index of said glass-reinforcing fibers or filaments and one of said polyester resin syrups when cured has a refractive index above the refractive index of said glass-reinforcing elements, and wherein the mixture of polyester resin syrups when cured has a refractive index which
    forming a composite by combining the mixture of polyester resin syrups with said glass-reinforcing fibers or filaments;
    molding or casting said composite to form said laminates or panels.
2. The process of claim 1 wherein the polymerizable unsaturated polyester is an unsaturated linear polyester and wherein the copolymerizable monomer is styrene.